United States Patent
Rösel (10) Patent No.: US 7,849,844 B2
(45) Date of Patent: Dec. 14, 2010

(54) DIAGNOSTIC METHOD AND DEVICE FOR OPERATING AN INTERNAL COMBUSTION ENGINE

(75) Inventor: Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 223 days.

(21) Appl. No.: 12/296,511

(22) PCT Filed: Feb. 4, 2008

(86) PCT No.: PCT/EP2008/051360

§ 371 (c)(1),
(2), (4) Date: Oct. 8, 2008

(87) PCT Pub. No.: WO2008/095904

PCT Pub. Date: Aug. 14, 2008

(65) Prior Publication Data

US 2009/0223499 A1    Sep. 10, 2009

(30) Foreign Application Priority Data

Feb. 5, 2007    (DE) ................. 10 2007 005 680

(51) Int. Cl.
F02D 41/02    (2006.01)
F02D 41/00    (2006.01)
(52) U.S. Cl. .................... 123/672; 701/109
(58) Field of Classification Search .......... 123/672, 123/693, 694, 695, 696, 703; 701/103, 109, 701/114, 115; 60/274, 276, 277, 285
See application file for complete search history.

(56) References Cited

U.S. PATENT DOCUMENTS

| | | | | |
|---|---|---|---|---|
| 5,842,340 A | * | 12/1998 | Bush et al. | 60/274 |
| 6,799,419 B2 | | 10/2004 | Rösel et al. | |
| 6,877,311 B2 | | 4/2005 | Uchida | 60/277 |

(Continued)

FOREIGN PATENT DOCUMENTS

DE    19953601    5/2001

(Continued)

OTHER PUBLICATIONS

German Office Action, German application No. 102007005680.1-26, 8 pages, Jul. 19, 2007.

(Continued)

*Primary Examiner*—Mahmoud Gimie
(74) *Attorney, Agent, or Firm*—King & Spalding L.L.P.

(57) ABSTRACT

An internal combustion engine has an exhaust gas catalyst, a first exhaust gas sensor that is arranged for use in lambda control, and a second sensor that is arranged for trim control. The measuring signal of the second sensor is used to determine a NOx quality value depending on the HC quality value and the NOx correction factor. A lambda quality value is determined depending on an actual value and a basic set value of the air/fuel ratio. An error indicator is determined depending on the lambda quality value and the NOx quality value, the error indicator being representative of a mixture component error in a first range and being representative of an exhaust gas catalyst error in a second range. At least one control parameter of a trim control and/or the trim set value of the trim control is adapted depending on the NOx correction factor.

8 Claims, 3 Drawing Sheets

U.S. PATENT DOCUMENTS

| | | |
|---|---|---|
| 7,431,025 B2 | 10/2008 | Cianciara et al. |
| 7,559,193 B2 * | 7/2009 | Iihoshi et al. ............ 60/285 |
| 2003/0221415 A1 | 12/2003 | Rösel et al. |
| 2004/0000135 A1 | 1/2004 | Uchida |

FOREIGN PATENT DOCUMENTS

| | | |
|---|---|---|
| DE | 19953601 A1 | 5/2001 |
| DE | 10330367 A1 | 3/2005 |
| DE | 102005007830 A1 | 8/2006 |
| DE | 102005045888 | 9/2006 |
| DE | 102005045888 B3 | 9/2006 |
| EP | 0793009 | 2/1997 |
| EP | 0793009 A2 | 9/1997 |
| WO | 01/77503 A1 | 10/2001 |
| WO | 0177503 | 10/2001 |

OTHER PUBLICATIONS

International Search Report, PCT/EP2008/051360, 10 pages, May 13, 2008.

International Search Report and Written Opinion; PCT/EP2008/051360; pp. 11, May 13, 2008.

* cited by examiner

DIAGNOSTIC METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2008/051360 filed Feb. 4, 2008, which designates the United States of America, and claims priority to German Application No. 10 2007 005 680.1 filed Feb. 5, 2007, the contents of which are hereby incorporated by reference in their entirety.

TECHNICAL FIELD

The invention relates to a method and device for operating an internal combustion engine with an exhaust gas catalytic converter, a first exhaust gas probe, which is arranged so that it can be deployed as part of a lambda control, and a second exhaust gas probe, which is arranged so that it can be deployed as part of a trim control.

BACKGROUND

Increasingly stringent statutory regulations relating to permitted pollutant emissions in motor vehicles, in which internal combustion engines are arranged, mean that pollutant emissions during operation of the internal combustion engine have to be kept as low as possible. This can be achieved on the one hand by reducing the pollutant emissions which result in the respective cylinders during combustion of the air/fuel mixture. On the other hand exhaust gas post-treatment systems are deployed in internal combustion engines to convert the pollutant emissions generated in the respective cylinder during the combustion process of the air/fuel mixture to harmless substances. Three-way catalytic converters are deployed as exhaust gas catalytic converters in petrol combustion engines in particular. Highly efficient conversion of the pollutant components, such as carbon monoxide (CO), hydrocarbons (HC) and nitrogen oxides (NOx), requires a precisely set air/fuel ratio in the cylinders.

The composition of the mixture upstream of the exhaust gas catalytic converter must also exhibit a predefined fluctuation and so specific operation of the internal combustion engine is necessary, both with an excess of air and a shortage of air, to fill and empty an oxygen storage unit of the exhaust gas catalytic converter. When oxygen is introduced into the oxygen storage unit, nitrogen oxides in particular are reduced, while when the oxygen storage unit is emptied, oxidation is assisted and stored oxygen molecules are prevented from deactivating sub-regions of the exhaust gas catalytic converter.

The oxygen storage unit is for example also configured to store oxygen for very short periods and to bind it or release it as required. It has a surface storage unit and a deep storage unit for storing oxygen.

A lambda control and a trim control assigned to it for petrol-operated internal combustion engines is known from the specialist publication "Handbuch Verbrennungsmotoren" (Internal combustion engine handbook), published by Richard von Basshuysen/Fred Schäfer, $2^{nd}$ edition, June 2002, Friedrich Vieweg und Sohn Verlagsgesellschaft mbH Braunschweig/Wiesbaden, pages 559-561. The lambda control is intended to ensure that the pollutant components CO, HC and NOx are converted as efficiently as possible, in conjunction with the deployment of an exhaust gas catalytic converter configured as a three-way catalytic converter.

The lambda control includes the upward modulation of a forced stimulation to a setpoint value of the air/fuel ratio to optimize the efficiency of the catalytic converter. An actual value of the air/fuel ratio is determined as a function of the signal from a linear lambda probe upstream of the exhaust gas catalytic converter and thus a control deviation is determined for the lambda controller, which is configured as a $PII^2D$ controller, and a correction value for correcting a quantity of fuel to be metered in is determined at its output. The quantity of fuel to be metered in, which has been corrected by means of the correction value, is metered into the combustion chambers of the cylinders by way of the fuel injection valves.

The trim controller is configured as a PI controller, which utilizes the signal of the probe downstream of the catalytic converter, which is less exposed to cross-sensitivities.

It is known from the same specialist publication, pages 568 ff., that the catalytic converter can be monitored. The oxygen storage capacity of the catalytic converter is used for this purpose, correlating with hydrocarbon conversion in the exhaust gas catalytic converter. Greater forced stimulation is deployed for catalytic converter diagnosis. In the case of a new exhaust gas catalytic converter with a relatively high oxygen storage capacity these control fluctuations are significantly attenuated and the probe signal downstream of the exhaust gas catalytic converter therefore only has a small fluctuation amplitude. An older catalytic converter has a significantly poorer storage behavior, so that the fluctuation present before the exhaust gas catalytic converter has a correspondingly greater impact on the exhaust gas probe downstream of the catalytic converter. To monitor the catalytic converter therefore the signal amplitudes of the lambda probes in front of and behind the catalytic converter are evaluated and the quotient of the amplitudes is then formed. This amplitude ratio is used to assess the conversion rate of the catalytic converter.

There is an increasing requirement to monitor for possible nitrogen oxide emissions as well and in particular also to estimate NOx emissions.

SUMMARY

A method and a device for operating an internal combustion engine can be created, which allow reliable operation of the internal combustion engine.

According to an embodiment, a method for operating an internal combustion engine with an exhaust gas catalytic converter, first exhaust gas probe, which is arranged so that it can be used in a lambda control, and a second exhaust gas probe, which is arranged so that it can be used in a trim control, may comprise the steps of:—determining an HC quality value, which is representative of an oxygen storage capacity of the exhaust gas catalytic converter as a function of a measuring signal from the second exhaust gas probe,—determining a NOx correction value as a function of the measuring signal from the second exhaust gas probe, as a function of signal elements, which are representative of residual oxygen present,—determining a NOx quality value as a function of the HC quality value and the NOx correction value,—determining a lambda quality value as a function of an actual value and a base setpoint value of the air/fuel ratio, which is representative of a temporal profile of a deviation of the actual value from the base setpoint value of the air/fuel ratio,—determining an error indicator as a function of the lambda quality value and the NOx quality value, which in a first value range is representative of a mixture component error and in a second value range is representative of an exhaust gas catalytic converter error,—adjusting at least one of a controller parameter of a trim controller and a trim setpoint value of the trim controller as a function of the NOx correction value if the error indicator is representative of the mixture component error and the error indicator is only deemed to be valid in respect of the mixture component error if the error indicator continues to be representative of mixture component error despite the adjustment.

According to another embodiment, a device for operating an internal combustion engine may comprise an exhaust gas catalytic converter, a first exhaust gas probe, which is arranged for use in a lambda control, and a second exhaust gas probe, which is arranged for use in a trim control, wherein the device being operable—to determine an HC quality value, which is representative of an oxygen storage capacity of the exhaust gas catalytic converter as a function of a measuring signal from the second exhaust gas probe,—to determine a NOx correction value as a function of the measuring signal from the second exhaust gas probe, as a function of signal elements, which are representative of residual oxygen present,—to determine a NOx quality value as a function of the HC quality value and the NOx correction value,—to determine a lambda quality value as a function of an actual value and a base setpoint value of the air/fuel ratio, which is representative of a temporal profile of a deviation of the actual value from the base setpoint value of the air/fuel ratio,—to determine an error indicator as a function of the lambda quality value and the NOx quality value, which in a first value range is representative of a mixture component error and in a second value range is representative of an exhaust gas catalytic converter error, and—to adjust at least one controller parameter of a trim controller and/or a trim setpoint value of the trim controller as a function of the NOx correction value if the error indicator is representative of the mixture component error and only to deem the error indicator to be valid in respect of the mixture component error if the error indicator continues to be representative of mixture component error despite the adjustment.

According to a further embodiment, the error indicator can be assigned a value from the first value range, when the NOx quality value is representative of at least one predefined high NOx emission and when a lambda quality value correlating temporally with the NOx quality value is representative of the exceeding of a predefined temporal deviation of the actual value from the base value of the air/fuel ratio. According to a further embodiment, the error indicator can be assigned a value from the second value range, when the NOx quality value is representative of at least the predefined high NOx emission and when a lambda quality value correlating temporally with the NOx quality value is representative of a fall below a predefined temporal deviation of the actual value from the base value of the air/fuel ratio. According to a further embodiment, the at least one controller parameter of the trim controller and/or the trim setpoint value of the trim controller may be adjusted as a function of the NOx quality value.

BRIEF DESCRIPTION OF THE DRAWINGS

Exemplary embodiments are described in more detail below with reference to the schematic drawings, in which.

Elements with the same structure or function are marked with the same reference characters in all the figures.

DETAILED DESCRIPTION

According to various embodiment, in a method and a corresponding device for operating an internal combustion engine with an exhaust gas catalytic converter, a first exhaust gas probe, which is arranged so that it can be deployed as part of a lambda control, in other words in particular upstream or within the exhaust gas catalytic converter, and a second exhaust gas probe, which is arranged so that it can be deployed as part of a trim control, in other words in particular downstream of the exhaust gas catalytic converter or in some instances again within the exhaust gas catalytic converter, but in any event downstream of the first exhaust gas probe, an HC quality value, which is representative of the oxygen storage capacity of the exhaust gas catalytic converter, is determined as a function of a measuring signal from the second exhaust gas probe. A NOx correction value is determined as a function of the measuring signal from the second exhaust gas probe, as a function of signal elements, which are representative of residual oxygen present. A NOx quality value is determined as a function of the HC quality value and the NOx correction value. This utilizes the knowledge that the HC quality value has a certain correlation in respect of the NOx quality value and therefore with NOx emissions. The knowledge is also utilized that the NOx quality value can be determined with even greater accuracy taking into account the NOx correction value, thereby allowing clearer identification of NOx emissions.

This may also have the advantage that there is no need to deploy further sensors. In particular cold start emissions, which essentially comprise hydrocarbon emissions, and warm emissions, which essentially comprise nitrogen oxides, are thus evaluated separately.

A lambda quality value is determined as a function of an actual value and a base setpoint value of the air/fuel ratio, the lambda quality value being representative of a temporal profile of a deviation of the actual value from the base value of the air/fuel ratio. An error indicator is determined as a function of the lambda quality value and the NOx quality value, said error indicator being representative in a first value range of a mixture component error and being representative in a second value range of a catalytic converter error. It is thus easy to separate the error locations without deploying additional sensors, thus distinguishing between mixture component errors and catalytic converter errors. This also allows very specific error elimination, optionally in a workshop, or it allows more specific measures to be implemented before elimination of the actual error, to reduce the impact of the respective error at least.

The first and second value ranges can respectively comprise a number of possible values or alternatively however they can respectively comprise only one value, this being able to be the case independently for the two value ranges. The first and second value ranges can also be separated from one another by a third value range.

At least one controller parameter of a trim controller and/or the trim setpoint value of the trim controller is/are adjusted as a function of the NOx correction value, when the error indicator is representative of the mixture component error, and the error indicator is only deemed to be valid in respect of the mixture component error, if the error indicator continues to be representative of mixture component error despite the adjustment. This also allows emission stabilization by the trim controller, which means that possible impairment of drive capacity and/or additional repair outlay for mixture components can be avoided when emission stabilization is carried out by the trim controller.

The thus extended intervention of the trim controller can thus reduce NOx emissions in some instances, accelerated by the resulting enrichment of the air/fuel mixture. It is thus possible to attempt first to suppress a source of emissions, before the error in the region of the mixture components has to be identified as valid, which can also include the outputting of the error. Exhaust gas catalytic converters can thus also be deployed advantageously with a low precious metal load. It is also possible to improve the accuracy of the identification of an error in the case of mixture components.

According to an embodiment, the error indicator is assigned a value from the first value range, when the NOx quality value is representative of at least one predefined high NOx emission and when a lambda quality value correlating temporally with the NOx quality value is representative of the exceeding of a predefined temporal deviation of the actual value from the base value of the air/fuel ratio. It is possible to identify a mixture component error particularly reliably in this manner.

According to a further embodiment, the error indicator is assigned a value from the second value range, when the NOx quality value is representative of at least the predefined high NOx emission and when a lambda quality value correlating temporally with the NOx quality value is representative of a fall below the predefined temporal deviation of the actual value from the base value of the air/fuel ratio. It is possible to identify an exhaust gas catalytic converter error particularly reliably in this manner. The predefined deviation can also be predefined differently in respect of exceeding and falling below, so that there is an intermediate range in between.

According to a further embodiment, the at least one control parameter of the trim controller and/or the trim setpoint value of the trim controller is/are adjusted as a function of the NOx quality value. Reliable operation is thus possible in a particularly simple manner.

An internal combustion engine (FIG. 1) has an intake tract 1, an engine block 2, a cylinder head 3 and an exhaust gas tract 4. The intake tract 1 preferably has a throttle valve 5, a manifold 6 and an intake pipe 7. The intake pipe 7 opens into an inlet duct, which leads to a cylinder Z1 in the engine block 2. The engine block 2 also has a crankshaft 8, which is coupled via a connecting rod 10 to a piston 11 of the cylinder Z1.

Figure 1:
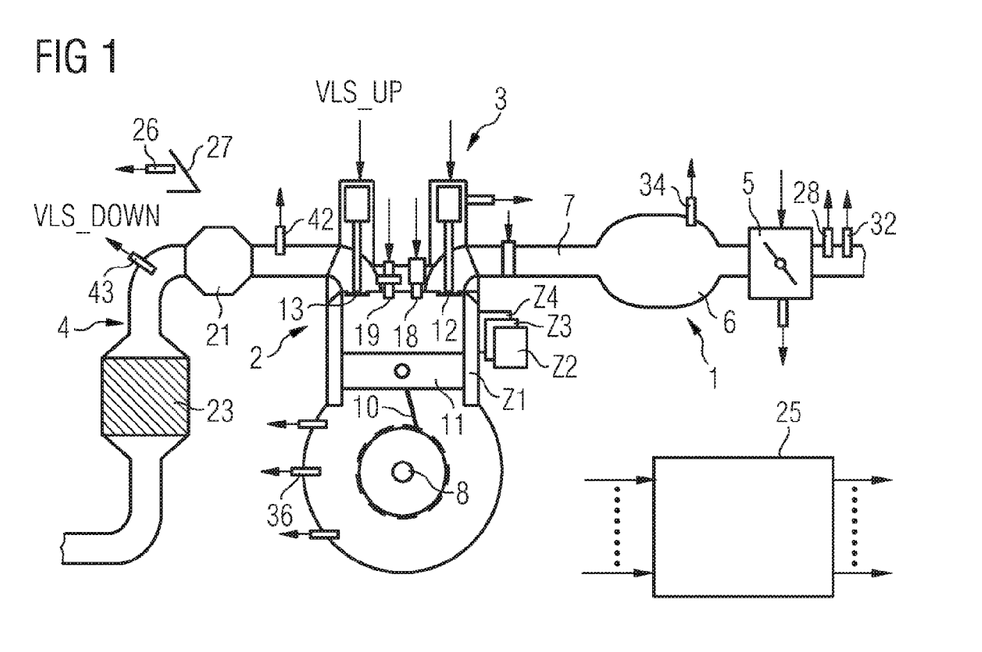
FIG. 1 shows an internal combustion engine with a control device.

The cylinder head has a valve gear mechanism with a gas inlet valve 12 and a gas outlet valve 13. The cylinder head 3 also has an injection valve 18 and a spark plug 19. Alternatively the injection valve 18 can also be located in the intake pipe 7.

An exhaust gas catalytic converter 21 is arranged in the exhaust gas tract 4, preferably being configured as a three-way catalytic converter. A further exhaust gas catalytic converter 23 can also be arranged in the exhaust gas tract and this can be a specific NOx catalytic converter for example.

The internal combustion engine also has a control device 25, which can also be referred to as a device for operating the internal combustion engine. Sensors are assigned to the control device 25 to detect various measured variables. Operating variables include both the measured variables and variables derived from them.

The control device is also assigned actuators, which act on final control elements of the internal combustion engine.

The control device is also configured to determine manipulated variables as a function of at least one of the operating variables, these then being converted to one or more actuation signals to control the final control elements by means of corresponding actuators. The control device comprises a storage unit for storing data and programs and also a computation unit for processing stored programs. The storage device also comprises a driver unit for generating corresponding actuation signals.

The sensors are configured as a pedal position sensor 26, which detects the position of an accelerator pedal 27, an air mass sensor 28, which is arranged upstream of the throttle valve 5 and detects the mass air flow flowing there, a temperature sensor 32, which detects an intake air temperature, an intake pipe pressure sensor 34, which detects an intake pipe pressure, a crankshaft angle sensor 36, which detects a crankshaft angle, to which a speed N of the internal combustion engine is assigned.

The sensors also include a first exhaust gas probe 42, which is arranged so that it can be deployed as part of a lambda control. The first exhaust gas probe 42 is preferably arranged upstream of the exhaust gas catalytic converter 21 in the exhaust gas tract 4. It can however also be arranged in the exhaust gas catalytic converter 21. The first exhaust gas probe 42 is configured to detect a residual oxygen content of the exhaust gas. Its measuring signal VLS_UP is therefore characteristic of the air/fuel ratio in the combustion chamber of the cylinder Z1 and upstream of the exhaust gas probe 42 before oxidation of the fuel. The first exhaust gas probe 42 is preferably configured as a linear lambda probe. An exemplary embodiment of such a linear lambda probe is disclosed for example in the "Handbuch Verbrennungsmotor" cited above in the introduction, page 589, whose content is hereby incorporated in this regard.

A second exhaust gas probe 43 is also provided, which is arranged so that it can be deployed as part of a trim control. The second exhaust gas probe 43 is preferably configured as a binary lambda probe, also referred to as a jump probe. The second exhaust gas probe 43 is preferably arranged downstream of the exhaust gas catalytic converter 21. It can however also be arranged within the exhaust gas catalytic converter 21. However in this instance it is arranged downstream of the first exhaust gas probe 42 in any event.

The measuring signal VLS_DOWN from the second exhaust gas probe 43 is characteristic of a residual oxygen content of the exhaust gas in the region of the second exhaust gas probe 43.

The said sensors or even a sub-set of them or even additional sensors can be assigned to the control device 25.

The final control elements are for example the throttle valve 5, the gas inlet and gas outlet valves 12, 13, the injection valve 18 or the spark plug 19.

As well as the cylinder Z1, further cylinders Z2 to Z4 are also preferably provided, to which corresponding final control elements and optionally sensors are similarly assigned.

Figure 2:
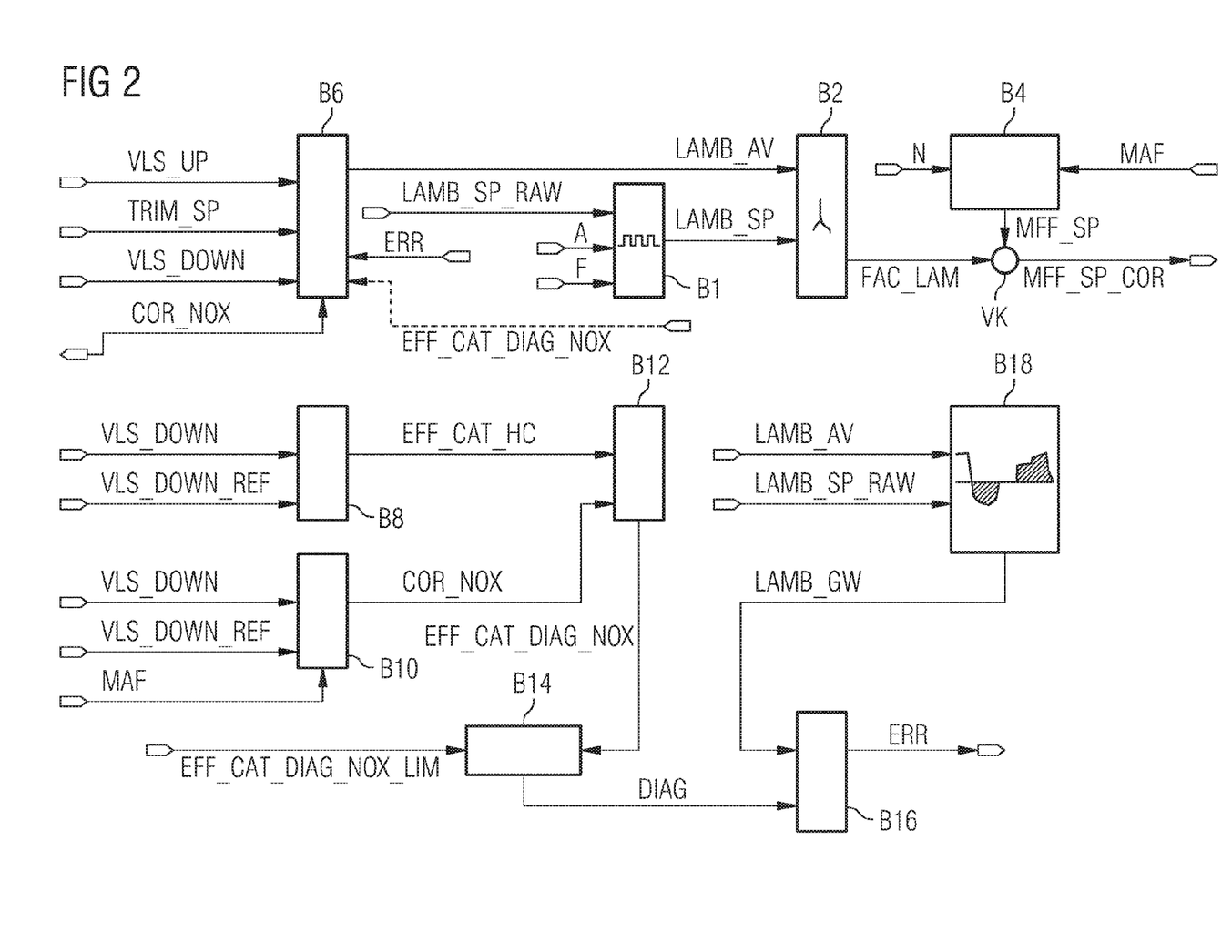
FIG. 2 shows a block circuit diagram of parts of the control device.

Parts of the control device 25 are described in more detail below with reference to the block circuit diagram in FIG. 2. The block circuit diagram comprises blocks B1 to B18, which are also referred to as function blocks and whose functionalities are preferably stored in the form of programs in the control device and which are then preferably processed during operation of the internal combustion engine.

A base setpoint value LAMB_SP_RAW of the air/fuel ratio, which can be predefined by a further function (not shown) or can even be predefined in principle in a fixed manner, is supplied to a block B1 on the input side. The base setpoint value LAMB_SP_RAW of the air/fuel ratio preferably has a value, which is close to the stoichiometric air/fuel mixture.

A forced stimulation amplitude A and a forced stimulation frequency F are also supplied to the block B1. A forced stimulation is modulated up to the base setpoint value LAMB_SP_RAW of the air/fuel ratio in the block B1 as a function of the forced stimulation amplitude A and the forced stimulation frequency F, to set a lambda fluctuation to optimize the catalytic converter efficiency of the exhaust gas catalytic converter 21. The corresponding forcibly stimulated setpoint value LAMB_SP of the air/fuel ratio is then output on the output side of the block B1, being routed to the block B2 on the input side.

The block B2 comprises a lambda controller, which is preferably configured as a linear lambda controller and which is preferably configured as a $PII^2D$ controller. Such a linear lambda controller is disclosed in the context of a lambda control in the "Handbuch Verbrennungsmotor" already cited in the introduction, on pages 559-561, whose content is herewith incorporated in this regard.

The lambda controller then generates a lambda correction value FAC_LAM on the output side of the block B2. In a block B4 a fuel mass to be metered in MFF_SP is determined as a function of a settable load. This is preferably done as a function of the speed N and the mass air flow MAF, which flows into the respective combustion chamber of the respective cylinder Z1 to Z4.

In a link point VK the fuel mass to be metered in MFF_SP is linked to the lambda correction value FAC_LAM to give a corrected fuel mass to be metered in MFF_SP_COR, which is then converted to a corresponding actuation signal to activate a respective injection valve 18.

A block B6 comprises a trim controller. The measuring signal VLS_DOWN from the second exhaust gas probe 43 and a trim setpoint value TRIM_SP are supplied to the block B6. The trim setpoint value TRIM_SP is preferably predefined and a function of the specific embodiment of the second exhaust gas probe 43. It can have a value between 650 and 700 mV for example. The trim controller preferably comprises a P, a D and optionally an I element. The control difference of the trim controller is preferably a function of the trim setpoint value TRIM_SP and the measuring signal VLS_DOWN from the second exhaust gas probe 43. In some instances the measuring signal VLS_DOWN from the second exhaust gas probe 43 is also filtered again before the control difference is formed.

An adaptation value can also be formed for example as a function of the actuation signal element, which is formed by the I element of the trim controller, for example from a central actuation signal element of the I element over a predefined time period. The actuation signal of the trim controller preferably acts in the form of a characteristic curve displacement of a characteristic curve, used to assign the measuring signal VLS_UP from the first exhaust gas probe 42 to the actual value LAMB_AV of the air/fuel ratio. It is thus possible in particular for the trim controller to compensate for a change in the characteristics of the first exhaust gas probe 42 over the operation of the internal combustion engine.

A block B8 is configured to determine an HC quality value EFF_CAT_HC as a function of the measuring signal VLS_DOWN from the second exhaust gas probe 43 and a reference value VLS_DOWN_REF of the measuring signal from the second exhaust gas probe 43. This is preferably done in the form of a verification of the oxygen storage capacity of the exhaust gas catalytic converter 21. For this purpose the forced stimulation amplitude A is preferably increased in predefined operating states, in particular in a quasi-stationary operating state, compared with normal operation and the HC quality value EFF_CAT_HC is determined over a predefined number of cycles of forced stimulation, for example around 20 cycles, as a function of a correlating amplitude of a fluctuation of the measuring signal VLS_DOWN from the second exhaust gas probe 43 in relation to the reference value VLS_DOWN_REF of the measuring signal from the second exhaust gas probe 43. In this process the knowledge is utilized that the amplitude of this fluctuation is smaller, the greater the oxygen storage capacity of the exhaust gas catalytic converter 42. In particular the surface oxygen storage behavior of the exhaust gas catalytic converter can thus be analyzed very precisely, being representative of the convertibility of HC emissions within the exhaust gas catalytic converter 42.

Alternatively the HC quality value EFF_CAT_HC can also be determined in a different manner, for example by corresponding oxygen balancing as a function of the measuring signal from the first exhaust gas probe 42 VLS_UP and the second measuring signal VLS_DOWN from the second exhaust gas probe 43.

A block B10 is configured to determine a NOx correction value COR_NOX. This is done as a function of the measuring signal VLS_DOWN from the second exhaust gas probe 43, the reference value VLS_DOWN_REF of the measuring signal from the second exhaust gas probe 43 and the mass air flow MAF. The procedure for determining the NOx correction value COR_NOX is described in more detail below with reference to the signal profiles according to FIG. 3.

Figure 3:
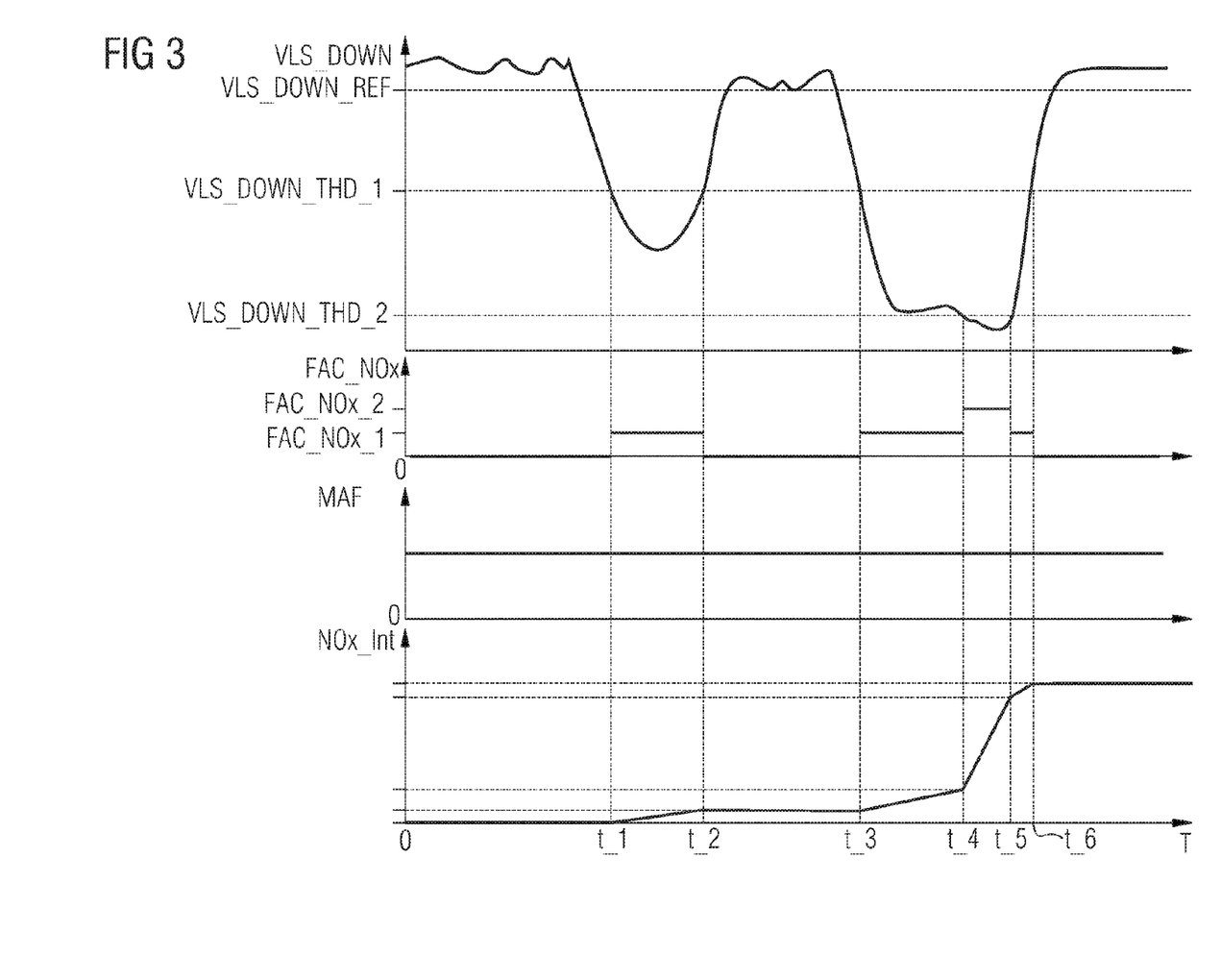
FIG. 3 shows signal profiles.

FIG. 3 shows the exemplary signal profile of the measuring signal VLS_DOWN from the second exhaust gas probe 43 over time T. In this exemplary embodiment the second exhaust gas probe 43 is configured so that its measuring signal VLS_DOWN has a smaller voltage value than the reference value VLS_DOWN_REF in the case of a residual oxygen element present in the region of the second exhaust gas probe 43, while having a greater voltage value than the reference value VLS_DOWN_REF when no residual oxygen element is correspondingly present.

By way of example a first and second threshold value VLS_DOWN_THD_1 and VLS_DOWN_THD_2 are predefined, to which NOx factors FAC_NOx and a first and/or second NOx factor value FAC_NOx_1, FAC_NOx_2 are then assigned. These are preferably predefined in a fixed manner and determined for example by corresponding experiments or simulations. The respective value of the mass air flow MAF and the NOx factor, which is temporally just assigned, are preferably linked to one another and this product is then integrated. This gives the profile of a NOx integral NOx_INT shown in the lower part of FIG. 3. t_1 to t_6 indicate corresponding times here. The NOx integral NOx_INT is preferably determined in predefined drive situations, for example at constant speed with a high engine load and also in acceleration phases.

The NOx correction value COR_NOX is then determined as a function of the NOx integral NOx_INT. This can be done, when a predefined condition is satisfied, which is for example related to the temporal duration of the integration process.

The NOx correction value COR_NOX is an input variable for a block B12, to which the HC quality value EFF_CAT_HC is likewise assigned. A NOx quality value EFF_CAT_DIAG_NOX is determined in the block B12 as a function of the HC quality value EFF_CAT_HC and the NOx correction value COR_NOX. This is preferably done by multiplicative linking. It can however also be done by additive linking for example.

A comparison of the NOx quality value EFF_CAT_DIAG_NOX with a NOx limit quality value EFF_CAT_DIAG_NOX_LIM, which is preferably predefined in a fixed manner and for example corresponds to the behavior of a so-called limit catalytic converter, in other words an exhaust gas catalytic converter, which still complies with predefined exhaust gas values, is preferably carried out in a block B14. Depending on the result of the comparison a diagnosis indicator DIAG is then determined with a correspondingly characteristic value, which depending on the outcome of the comparison is characteristic of an error, in particular due to high NOx emissions, or no error.

The actual value LAMB_AV of the air/fuel ratio and the base setpoint value LAMB_SP_RAW of the air/fuel ratio are supplied to a block B18. The block B18 is configured to determine a lambda quality value LAMB_GW as a function of the actual value LAMB_AV and the base setpoint value LAMB_SP_RAW of the air/fuel ratio, which is representative of a temporal profile of a deviation of the actual value from the base value of the air/fuel ratio. The deviation is preferably determined absolutely, in other words without taking account of the sign.

An error indicator ERR is then determined in the block B16 as a function of the diagnosis indicator DIAG and the temporally correlating lambda quality value LAMB_GW. If the diagnosis indicator DIAG has the value, which represents a non-permissible increase in NOx emissions, it is checked in the block B16 whether the correspondingly temporally correlating lambda quality value LAMB_GW is representative of a significant deviation in the corresponding time period of the actual value LAMB_AV from the base setpoint value LAMB_SP_RAW of the air/fuel ratio. If so, the error indicator ERR is assigned a value within a first value range, which is representative of a mixture component error.

If on the other hand the diagnosis indicator DIAG likewise has a value, which indicates a non-permissible increase in NOx emissions, but the lambda quality value LAMB_GW, which correlates temporally, is not representative of a significant deviation of the actual value LAMB_AV from the base setpoint value LAMB_SP_RAW of the air/fuel ratio, a value within a second value range is assigned to the error indicator ERR, which is representative of an exhaust gas catalytic converter error. The error indicator ERR preferably has a third value range, which is representative of neither a mixture component error nor an exhaust gas catalytic converter error being present. The first to third value ranges can also have just one value respectively, so that three different values can be assigned to the error indicator ERR. Alternatively the error indicator can also have a sub-indicator for mixture component errors and a further sub-indicator for exhaust gas catalytic converter errors.

The NOx correction value COR_NOX or the NOx quality value EFF_CAT_DIAG_NOX derived therefrom and also the error indicator ERR are supplied to the block B6, which comprises the trim controller.

If the error indicator ERR has a value in the first value range, which is therefore representative of a mixture component error, a controller parameter of the trim controller and/or the trim setpoint value TRIM_SP can be corrected first, as a function of the NOx correction value COR_NOX. The NOx correction value COR_NOX can be used directly for this purpose for example or the NOx quality value EFF_CAT_DIAG_NOX. In particular the value of the error indicator ERR on an error display can for example be delayed in the event of a supposed error, only taking place after an intervention within the trim controller. Only after one or a number of repeat calculations of the error indicator ERR with new values of the diagnosis indicator DIAG, when the value of the error indicator ERR, which is representative of the first value range and thus of the mixture component error, can said mixture component error be output in the form of an error entry or a display.

The P or even D controller parameters of the trim controller are preferably adjusted in the block B6 as a function of the NOx correction value COR_NOX or even directly as a function of the NOx quality value EFF_CAT_DIAG_NOX, if a value within the first value range is present at the error indicator ERR.

Alternatively or additionally an I parameter of the trim controller can be adjusted correspondingly in this instance or even an adaptation value determined from a central I element for example can be adjusted as part of the trim control or even the trim setpoint value TRIM_SP can be adjusted in this instance as a function of the NOx correction value COR_NOX or the NOx quality value EFF_CAT_DIAG_NOX.

In this process the corresponding controller parameters or even the trim setpoint value TRIM_SP for example can also be adjusted to different degrees at the same time as a function of the NOx correction value COR_NOX or even directly as a function of the NOx quality value EFF_CAT_DIAG_NOX or the adjustment can even take place as a function of the respective values of the NOx correction value COR_NOX or the NOx quality value EFF_CAT_DIAG_NOX or even the error indicator ERR.

What is claimed is:

1. A method for operating an internal combustion engine with an exhaust gas catalytic converter, first exhaust gas probe, which is arranged so that it can be used in a lambda control, and a second exhaust gas probe, which is arranged so that it can be used in a trim control, the method comprising the steps of determining an HC quality value, which is representative of an oxygen storage capacity of the exhaust gas catalytic converter as a function of a measuring signal from the second exhaust gas probe, determining a NOx correction value as a function of the measuring signal from the second exhaust gas probe, as a function of signal elements, which are representative of residual oxygen present, determining a NOx quality value as a function of the HC quality value and the NOx correction value, determining a lambda quality value as a function of an actual value and a base setpoint value of the air/fuel ratio, which is representative of a temporal profile of a deviation of the actual value from the base setpoint value of the air/fuel ratio, determining an error indicator as a function of the lambda quality value and the NOx quality value, which in a first value range is representative of a mixture component error and in a second value range is representative of an exhaust gas catalytic converter error, adjusting at least one of a controller parameter of a trim controller and a trim setpoint value of the trim controller as a function of the NOx correction value if the error indicator is representative of the mixture component error and the error indicator is only deemed to be valid in respect of the mixture component error if the error indicator continues to be representative of mixture component error despite the adjustment.

2. The method according to claim 1, wherein the error indicator is assigned a value from the first value range, when the NOx quality value is representative of at least one predefined high NOx emission and when a lambda quality value correlating temporally with the NOx quality value is representative of the exceeding of a predefined temporal deviation of the actual value from the base value of the air/fuel ratio.

3. The method according to claim 1, wherein the error indicator is assigned a value from the second value range, when the NOx quality value is representative of at least the predefined high NOx emission and when a lambda quality value correlating temporally with the NOx quality value is representative of a fall below a predefined temporal deviation of the actual value from the base value of the air/fuel ratio.

4. The method according to claim 1, wherein the at least one controller parameter of the trim controller and/or the trim setpoint value of the trim controller is adjusted as a function of the NOx quality value.

5. A device for operating an internal combustion engine comprising an exhaust gas catalytic converter, a first exhaust gas probe, which is arranged for use in a lambda control, and a second exhaust gas probe, which is arranged for use in a trim control, wherein the device being operable
- to determine an HC quality value, which is representative of an oxygen storage capacity of the exhaust gas catalytic converter as a function of a measuring signal from the second exhaust gas probe,
- to determine a NOx correction value as a function of the measuring signal from the second exhaust gas probe, as a function of signal elements, which are representative of residual oxygen present,
- to determine a NOx quality value as a function of the HC quality value and the NOx correction value,
- to determine a lambda quality value as a function of an actual value and a base setpoint value of the air/fuel ratio, which is representative of a temporal profile of a deviation of the actual value from the base setpoint value of the air/fuel ratio,
- to determine an error indicator as a function of the lambda quality value and the NOx quality value, which in a first value range is representative of a mixture component error and in a second value range is representative of an exhaust gas catalytic converter error, and
- to adjust at least one controller parameter of a trim controller and/or a trim setpoint value of the trim controller as a function of the NOx correction value if the error indicator is representative of the mixture component error and only to deem the error indicator to be valid in respect of the mixture component error if the error indicator continues to be representative of mixture component error despite the adjustment.

6. The device according to claim 5, wherein the error indicator is assigned a value from the first value range, when the NOx quality value is representative of at least one predefined high NOx emission and when a lambda quality value correlating temporally with the NOx quality value is representative of the exceeding of a predefined temporal deviation of the actual value from the base value of the air/fuel ratio.

7. The device according to claim 5, wherein the error indicator is assigned a value from the second value range, when the NOx quality value is representative of at least the predefined high NOx emission and when a lambda quality value correlating temporally with the NOx quality value is representative of a fall below a predefined temporal deviation of the actual value from the base value of the air/fuel ratio.

8. The device according to claim 5, wherein the at least one controller parameter of the trim controller and/or the trim setpoint value of the trim controller is adjusted as a function of the NOx quality value.

* * * * *